United States Patent
Newton et al.

(10) Patent No.: US 10,051,716 B2
(45) Date of Patent: Aug. 14, 2018

(54) LIGHTING CONTROL APPARATUS AND METHOD

(71) Applicant: PHILIPS LIGHTING HOLDING B.V., Eindhoven (NL)

(72) Inventors: Philip Steven Newton, Waalre (NL); Dzmitry Viktorovich Aliakseyeu, Eindhoven (NL); Bartel Marinus Van De Sluis, Eindhoven (NL); Jonathan David Mason, Waalre (NL); Sanae Chraibi, Eindhoven (NL); Tim Dekker, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/528,299

(22) PCT Filed: Nov. 13, 2015

(86) PCT No.: PCT/IB2015/058783
§ 371 (c)(1),
(2) Date: May 19, 2017

(87) PCT Pub. No.: WO2016/079647
PCT Pub. Date: May 26, 2016

(65) Prior Publication Data
US 2017/0325323 A1 Nov. 9, 2017

Related U.S. Application Data

(60) Provisional application No. 62/081,622, filed on Nov. 19, 2014.

(51) Int. Cl.
| H05B 33/08 | (2006.01) |
| H05B 37/02 | (2006.01) |
| F21V 23/04 | (2006.01) |

(52) U.S. Cl.
CPC ..... *H05B 37/0272* (2013.01); *F21V 23/0442* (2013.01); *H05B 33/0854* (2013.01); *G08C 2201/30* (2013.01)

(58) Field of Classification Search
CPC ............ H05B 37/0272; H05B 37/0227; H05B 37/0245; H05B 37/02; H05B 33/0842;
(Continued)

(56) References Cited

U.S. PATENT DOCUMENTS

| 6,016,038 A | 1/2000 | Mueller et al. |
| 6,211,626 B1 | 4/2001 | Lys et al. |

(Continued)

FOREIGN PATENT DOCUMENTS

EP 2651190 A2 10/2013

*Primary Examiner* — Douglas W Owens
*Assistant Examiner* — Borna Alaeddini
(74) *Attorney, Agent, or Firm* — Meenakshy Chakravorty (57) ABSTRACT

A lighting control apparatus (106) may include an accelerometer (118), a wireless communication interface (112), and a secure connection (125) for securing the lighting control apparatus to a surface. The secure connection may be configured to transfer motion imparted on the surface to the accelerometer. A controller (108) may be coupled with the accelerometer and the wireless communication interface. The controller may be configured to: receive, from the accelerometer, a signal representative of motion sensed by the accelerometer; determine, based on the signal from the accelerometer, that the sensed motion satisfies a motion criterion; and transmit, over the wireless communication interface to a lighting unit (104) or a lighting system bridge (102), data configured to cause one or more lighting units to emit light having one or more selected properties.

13 Claims, 3 Drawing Sheets

(58) Field of Classification Search
CPC ............ H05B 33/0854; H05B 33/0863; G08C 2201/93; G08C 2201/32; G06F 3/017; G06F 3/016; G06F 3/0416
See application file for complete search history.

(56) References Cited

U.S. PATENT DOCUMENTS

| | | | |
|---|---|---|---|
| 7,597,449 B2 * | 10/2009 | Stokes | G08B 5/006 2/159 |
| 8,485,681 B2 * | 7/2013 | Richter | F21V 33/0008 2/160 |
| 9,445,480 B2 * | 9/2016 | Min | H05B 33/0842 |
| 9,632,622 B2 * | 4/2017 | Hotelling | G06F 3/0418 |
| 9,769,906 B2 * | 9/2017 | Newton | H05B 37/0227 |
| 9,884,164 B2 * | 2/2018 | Tass | A61M 21/02 |
| 2009/0241052 A1 | 9/2009 | Ha et al. | |
| 2012/0139449 A1 * | 6/2012 | Zilber | H05B 37/0227 315/307 |
| 2012/0183156 A1 * | 7/2012 | Schlessinger | G06F 3/165 381/111 |
| 2013/0200811 A1 * | 8/2013 | Steininger | H05B 37/02 315/159 |

\* cited by examiner

LIGHTING CONTROL APPARATUS AND METHOD

CROSS-REFERENCE TO PRIOR APPLICATIONS

This application is the U.S. National Phase application under 35 U.S.C. § 371 of International Application No. PCT/IB2015/058783, filed on Nov. 13, 2015, which claims the benefit of U.S. Patent Application No. 62/081,622, filed on Nov. 19, 2014. These applications are hereby incorporated by reference herein.

TECHNICAL FIELD

The present invention is directed generally to lighting control. More particularly, various inventive methods and apparatus disclosed herein relate to controlling one or more properties of light emitted by a lighting unit based on one or more motions sensed by a lighting control apparatus that is secured to a surface of an object.

BACKGROUND

Digital lighting technologies, i.e., illumination based on semiconductor light sources, such as light-emitting diodes ("LEDs"), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Lamps and luminaires exist that provide users with limited capabilities to control emitted light with techniques other than operation of switches. For instance, a "clapper" enables a lamp to be controlled with sound, typically in the form of one or more claps from a user. Other lamps include touch-sensitive surfaces that may be at least partially capacitive. A user's touch may be detected based on a change in that capacitance, and light emitted by one or more light sources of the lamp may be altered based on the nature of the user's touch. However, such a lamp may require a custom luminaire designed to have an alterable capacitance. An antique luminaire with artistic and/or sentimental value may not be suitable for conversion into a touch-sensitive lamp. Additionally, a user may wish to control lighting by touching objects other than luminaires or lamps, such as a picture frame, a wall, a door knob, etc. Based on the foregoing, there is a need in the art to facilitate touch-based lighting control using various household objects and/or surfaces.

SUMMARY

The present disclosure is directed to inventive methods and apparatus for lighting control. For example, a lighting control apparatus may be secured to various objects and may be configured with one or more components configured to measure motion or force imparted on the object. One or more properties of light emitted by one or more lighting units may be selected based on one or more signals from these one or more components.

In various embodiments, a lighting control apparatus may include: an accelerometer; a wireless communication interface; a secure connection for connecting the lighting control apparatus to a surface and configured to transfer motion imparted on the surface to the accelerometer; and a controller coupled with the accelerometer and the wireless communication interface. The controller may be configured to: receive, from the accelerometer, a signal representative of motion sensed by the accelerometer; determine, based on the signal from the accelerometer, that the sensed motion satisfies a motion criterion; and transmit, over the wireless communication interface to a lighting unit or a lighting system bridge, data configured to cause one or more lighting units to emit light having one or more selected properties. In various embodiments, the data may include a lighting control command. In various embodiments, the data may include a signal that the sensed motion satisfies the motion criterion.

In various embodiments, the controller may be further configured to transition to a learning state in which the controller monitors one or more characteristics of one or more signals from the accelerometer over a learning time interval and generates one or more motion criteria based on the monitored one or more characteristics. In various versions, the controller may be further configured to cause audio or visual output to be rendered to prompt a user to apply a first force to the surface during the learning time interval. In various versions, the controller may be further configured to cause audio or visual output to be rendered to prompt the user to apply a second force to the surface that is different than the first force in response to a determination that the first force failed to satisfy a threshold. In various versions, the controller may be further configured to select, based on a signal received from the accelerometer during the learning time interval, a property of light or lighting scene to which a newly generated motion criterion is assigned. In various versions, the controller may be configured to determine, based on one or more characteristics of a signal received from the accelerometer, a sensitivity threshold to be associated with the accelerometer.

In various embodiments, the controller may be further configured to: identify, based on the sensed motion, a physical region of the surface to which force was applied; and select, based on the identified physical region, the one or more properties of light emitted by the one or more lighting units. In various embodiments, the lighting control apparatus may include a microphone coupled with the controller. The controller may be configured to determine that the sensed motion satisfies the motion criterion further based on a signal from the microphone.

In various embodiments, the lighting control apparatus may include a gyroscope. The controller may be configured to determine that the sensed motion satisfies the motion criterion further based on a signal from the gyroscope. In various embodiments, the controller may be configured to determine, based on the signal from the accelerometer, a magnitude of the sensed motion, and select, based on the magnitude, the one or more properties of light emitted by the one or more lighting units.

In various embodiments, the controller may be further configured to transition from an inactive state, in which the controller consumes a first amount of power, to an active state, in which the controller consumes a second amount of power that is greater than the first amount of power, in response to an interrupt raised by the accelerometer. The accelerometer may be configured to raise the interrupt in response to sensing motion that satisfies a threshold.

In various embodiments, the lighting control apparatus may include a placement sensor to raise a placement signal in response to detection that the lighting control apparatus has been secured to the surface. The controller may be configured to transition from an inactive state to an active state in response to the placement signal.

In another aspect, a lighting control method may include: activating a lighting control apparatus; securing the lighting control apparatus to an object; receiving, by the lighting control apparatus, one or more signals indicative of motion imparted on the object; identifying, based on the one or more signals, one or more predetermined motions to which the imparted motion corresponds; and selecting one or more properties of light to be emitted by one or more lighting units based on the identified one or more predetermined motions.

In various embodiments, the method may further include transitioning the lighting control apparatus into a learning state, obtaining, from a motion detector associated with the lighting control apparatus, one or more impulse patterns for storage as one or more predetermined motions, and identifying one or more properties of light to be associated with the one or more predetermined motions. In various versions, the transitioning may be performed in response to a determination, by the lighting control apparatus, that the securing has occurred.

In various embodiments, the activating may include uncovering an adhesive surface of the lighting control apparatus. In various embodiments, the securing may include securing the adhesive surface to a surface of the object. In various embodiments, the method may include determining that the one or more signals indicative of motion imparted on the object satisfy a threshold. In some such embodiments, the identifying may be performed in response to the determining.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit. The term "luminaire" is used herein to refer to a lighting fixture, lamp, or other device into which a lighting unit may be installed. For example, a lighting unit in the form of an LED light bulb may be screwed into a socket of a luminaire such as a desk lamp, hanging lamp or standing lamp. The luminaire may be connected to a power source such as AC mains, and may be configured to, among other things, supply power to an installed lighting unit so that the light unit is capable of emitting light.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Lamps and luminaires exist that provide users with limited capabilities to control emitted light with techniques other than operation of switches, such as touch-based and sound based (e.g., a "clapper"). However, not all lamps or luminaires are suitable for such techniques of control. Additionally, a user may wish to control lighting by touching objects unrelated to luminaires or lamps. Accordingly, there is a need in the art to facilitate touch-based lighting control using various household objects and/or surfaces. More generally, Applicants have recognized and appreciated that it would be beneficial to provide mechanisms for enabling users to control light output of lighting units and luminaires without requiring the luminaires or lighting units to be customized. For example, apparatus and techniques are disclosed that facilitate detection of user touch of a surface of any object, and control of one or more properties of light emitted by one or more lighting units based on that detected user touch.

Figure 1:
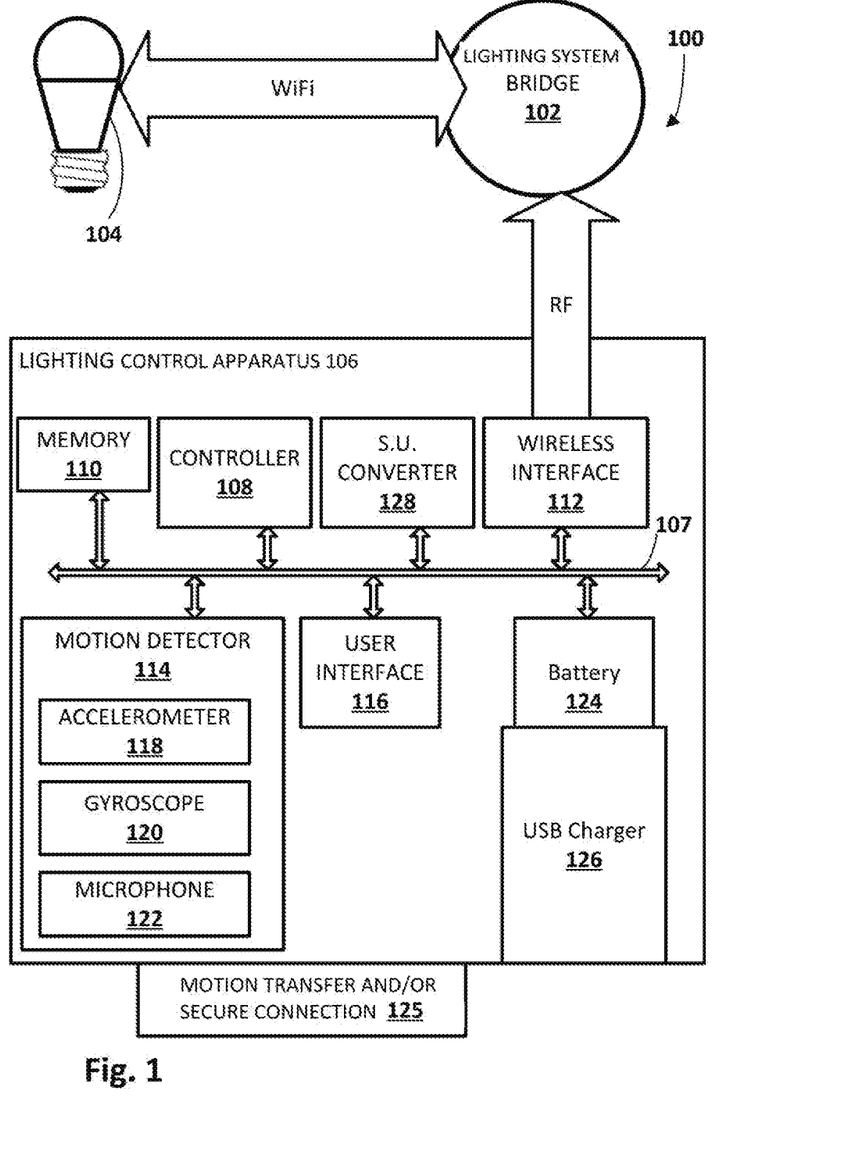
FIG. 1 illustrates schematically example components of a lighting system in which a lighting control apparatus configured with selected aspects of the present disclosure may be deployed, in accordance with various embodiments.

Referring to FIG. 1, in one embodiment, a lighting system 100 may include, and may be at least partially controlled by, a lighting system bridge 102. Lighting system bridge 102 may be a computing device that is in network communication with one or more lighting units 104 using various communication technologies, such as WiFi or ZIGBEE®. Lighting unit 104 may come in various forms, such as LED-based, incandescent, fluorescent, halogen, and so forth. In various embodiments, lighting unit 104 may include its own wireless communication interface (not depicted), as well as other control circuitry that enables it to exchange data with remote computing devices, such as lighting system bridge 102, and selectively emit light having various properties (e.g., hue, saturation, dynamic effects, intensity, etc.).

A lighting control apparatus 106 may be provided that may be portable until it is secured to an object. In some embodiments, lighting control apparatus 106 may be readily removable and replaceable with relation to one or more objects, and thus may be referred to as "removable," although this is not required. Lighting control apparatus 106 may be operable by a user to control one or more properties of light emitted by one or more lighting units 104. The lighting control apparatus 106 may be provided to be relatively small and inconspicuous or concealable with relation to the object. As such, the lighting control apparatus 106 can be attached to a personal or decorative object in the home that is positioned at a strategic location. For instance, it could be attached inside a vase that sits on the dining table, or be attached to the back of a painting frame that is positioned close to the entrance of the room, thereby turning the passive, non-interactive object into an interactive lighting control object. As a result a user can simply touch the decorative object to activate a pre-defined lighting scene.

Lighting control apparatus 106 may include various components that may be operably coupled in various ways, such as via one or more buses 107. In various embodiments, lighting control apparatus 106 may include a controller 108, memory 110, a wireless communication interface 112, a motion detector 114, and in some instances, an integral user interface 116. In various embodiments, memory 110 may include instructions that are executable by controller 108 to perform various operations described herein. In various embodiments, wireless communication interface 112 may be configured to communicate with remote computing devices using various wireless technologies that may or may not be based on radio frequencies ("RF"), such as ZIGBEE®, WiFi, near field communication ("NFC"), Bluetooth, and so forth.

In various embodiments, motion detector 114 may include an accelerometer 118, a gyroscope 120, and/or a microphone 122. One or more of these components 118, 120, and/or 122 may be used, alone or in combination, to sense and/or measure a motion that is experienced by lighting control apparatus 106 and/or an object (e.g. a first object) to which lighting control apparatus 106 is secured, and/or another object (e.g. a second object) to which the first object is "mechanically coupled." As used herein, two objects are "mechanically coupled" where there is some sort of direct or indirect physical contact between them that may facilitate transfer of motion. For example, a vase that sits on a table may be mechanically coupled to the table because motion imparted on one may be transferred at least in part to the other.

Accelerometer 118 may come in various forms, such as a two- or three-axis accelerometer or a simple tilt sensor, and may be configured to detect movement in various axes and provide a corresponding signal(s) to controller 108. In some embodiments, accelerometer 118 may be an ADXL345 Motion Sensor by Analog Devices in Norwood, Mass. Other sensors may be used in addition to or instead of the sensors described above including capacitive sensors, resistive (potentiometer) sensors, piezoelectric-based, optical, light-based (e.g., infrared), reflective (emitter/detector)-based and/or any other type of sensor that detects contact and/or proximity (e.g., hover) of a finger or other suitable pointing mechanism. The motion detector 114 may include an array of sensors disposed over the surface area of the object.

Lighting control apparatus 106 may be secured to a surface of an object using various means 125. In various embodiments, motion transfer and secure connection component 125 may be configured to both secure the lighting control apparatus to the surface of the object as well as transfer motion imparted on the surface of the object to motion detector 114, so that actions or motions resulting in a mechanical force applied to the object may be detected by motion detector 114. Thus, and as will be discussed throughout this disclosure, installation of lighting control apparatus 106 onto an object (and its subsequent activation) may, in effect, convert that object into a touch-activated lighting control device that can be used to control one or more properties of light emitted by one or more lighting units 104.

In various embodiments, secure connection component may come in various forms, and may be configured to secure lighting control apparatus 106 to various objects with various levels of tightness of mechanical connection. Secure connection and motion transfer component 125 may include but are not limited to various adhesives (e.g., activated by removing tape), hook and loop fasteners (e.g., Velcro), double sided foam tape (e.g., with removable tape to activate), suction cup(s), one or more magnets, one or more screws or a clips, and so forth. Lighting control apparatus 106 may have various form factors, including but not limited to a relatively flat sticker, a window sticker (e.g., with solar cell), a long strip, a tap sensor with a connector for connection to a lighting unit or luminaire, or a socket extender, for instance. In some embodiments, the motion transfer component may be separate from the secure connection component, while in other embodiments both may comprise one unit.

In some embodiments, motion detector 114 may be separate from lighting control apparatus 106 and may be configured to wireless transfer the detected motion signal to lighting control apparatus 106. The motion detector 114 may comprise a separate motion transfer and secure connection component 125 that allows the motion detector to be placed inconspicuously on the surface of the object. Motion detector 114 may include a radio-frequency transponder, which may be configured to collect DC power from a nearby lighting control apparatus 106.

Lighting control apparatus 106 may be activated before or after being secured to an object in various ways. In some embodiments, activating a battery may activate lighting control apparatus 106. In other embodiments, activation may be tied to secure connection 125. For example, a placement sensor 127 may transmit a placement signal in response to detection of lighting control apparatus 106 being secured to the surface. Controller 108 may be configured to transition from an inactive state to an active state in response to the placement signal. For example, remove of tape from an adhesive surface of lighting control apparatus 106 may expose and/or change capacitance and/impedance of or between various components, which may be sensed by placement sensor 127, and which in turn may trigger activation of lighting control apparatus 106.

In some embodiments, once lighting control apparatus 106 is activated, a graphical representation of lighting control apparatus 106 may be rendered on a computing device (e.g., smart phone, tablet computer smart watch, smart glasses, etc.) that is configured to control illumination of one or more lighting units 104 of lighting system 100. A user may be prompted by the computing device to impart some sort of motion (e.g., a tap) at or near the newly-activated lighting control apparatus 106. This may cause lighting control apparatus 106 to be added to lighting system 100. This routine of prompting the user for motion and receiving it may provide a secure way to add lighting control apparatus 106 to lighting system 100 without a neighbor's lighting system (not depicted), which may also receive a wireless signal from lighting control apparatus 106, also adding lighting control apparatus 106.

After activation (and in some instances operating in a "learning mode" or "learning state" described in more detail below), controller 108 may be configured to receive, e.g., from motion detector 114, one or more signals representative of motion sensed by motion detector 114. This motion may correspond to motion of an object to which lighting control apparatus 106 is secured. This motion may also correspond to motion or action on the surface of the object to which lighting control apparatus 106 is secured. Some examples of motions may include, but is not limited to, a press, a tap, a double-tap, a swipe, a squeeze, a zoom gesture, and a handprint or a combinations or sequence thereof. The one or more signals provided by motion detector 114 may be analyzed to determine whether the sensed motion satisfies one or more motion criteria, e.g., such as corresponding to one or more predetermined motions that in turn correspond to one or more lighting control commands.

The analysis to determine whether the sensed motion corresponds to one or more predetermined motions may be performed by various components of lighting system 100, such as lighting system bridge 102, one or more lighting units 104, or lighting control apparatus 106 itself. For example, controller 108 may delegate analysis of the signal to a remote computing device such as lighting system bridge 102 by transmitting data indicative of the sensed motion to the remote computing device. The remote computing device may determine whether the sensed motion corresponds to one or more predetermined motions that in turn correspond to one or more lighting control commands. In other embodiments, controller 108 may perform this analysis itself, or may delegate it instead to a lighting unit 104.

Impulse patterns representative of various predetermined motions may be stored in memory of various devices, such as memory of lighting system bridge 102, memory of one or more lighting units 104, or memory 110 of lighting control apparatus 106. In various embodiments, a signal received from motion detector 114 may be compared, e.g., by lighting system bridge 102 or controller 108, to these impulse patterns to determine which, if any, of the predetermined motions has been sensed. If an impulse pattern is found that corresponds to a signal from motion detector 114 representing a sensed motion, one or more lighting units 104 may be energized to emit light having one or more selected properties. A signal from motion detector 114 may correspond to an impulse pattern where it matches or comes close enough to the impulse pattern (e.g., within a predefined or user-controllable margin of error). Additionally or alternatively, a signal from motion detector 114 may correspond to an impulse pattern where a motion represented in the signal has an associated impulse response (e.g., how long a swipe associated with a detected acceleration takes to decrease to zero) that is similar (e.g., in duration) to that of a predetermined motion.

In some embodiments, in addition to or instead of determining whether a sensed motion corresponds with a predetermined motion, a magnitude of the sensed motion may be determined. The magnitude may be a magnitude of force or a magnitude or surface area. The magnitude of the sensed motion may be based on one or more signals from motion detector 114 that is based on one or more motions on the surface of the object. One or more properties of the emitted light may then be selected, e.g., by lighting system bridge 102 and/or controller 108, based on the determined magnitude. For instance, a hard tap may correspond a larger amount of pressure (e.g., with a high magnitude) that may correspond to a high level of intensity in emitted light. Similarly, a tap having a large surface area (e.g. a handprint) may correspond to a level of intensity in emitted light. A soft tap may correspond to a small amount of pressure and may correspond to a low level of intensity in emitted light. Similarly, a tap with a small surface area (e.g. a finger press) may correspond to a low level of intensity in emitted light.

In some embodiments, a magnitude of the sensed motion may dictate how many lighting units (or light sources of lighting units) are energized. Suppose a lighting control apparatus 106 is configured to control illumination of a plurality of lighting units positioned at various distances from where lighting control apparatus 106 is secured to a wall. Lighting control apparatus 106 may selectively energize one or more of those lighting units based at least in part on a magnitude of a tap on the wall, e.g., in a radiating pattern from the location of lighting control apparatus. If a tap is soft, lighting control apparatus 106 may energize only a select few lighting units that are closest to it. It a tap is relatively strong, lighting control apparatus 106 may energize more lighting units, including lighting units that are further away from it. Similarly, a tap with different surface areas may correspond to different number of lighting units being energized.

In further embodiments, in addition to or instead of determining whether a sensed motion corresponds with a predetermined motion, a direction of the sensed motion may be determined, e.g. based on one or more signals from motion detector 114 detected from the surface of the object. One or more properties of the emitted light may then be selected, e.g., by lighting system bridge 102 and/or controller 108, based on the determined direction. For instance, a swipe in one direction (e.g. upward direction) may correspond to a first level of intensity in emitted light. A swipe in another direction (e.g. downward direction) may correspond to a low level of intensity in emitted light (e.g. dimming of light). Similarly to magnitude, a sensed motion with a direction may correspond to control of multiple lighting sources.

In yet a further embodiment, in addition to or instead of determining whether a sensed motion corresponds with a predetermined motion, a timing or pattern of the sensed motion may be determined, e.g. based on one or more signals from motion detector 114 detected from the surface of the object. One or more properties of the emitted light may then be selected, e.g., by lighting system bridge 102 and/or controller 108, based on the determined timing. For instance, a tap-pause-tap may correspond to a predefined setting of emitted light (e.g. a property of light). Similarly to magnitude and direction, a sensed motion with timing (e.g. multiple taps) may correspond to control of multiple lighting sources.

As noted above, motion detector 114 may include other components besides accelerometer 118 to aide in touch-based lighting control. For instance, in some embodiments, a signal from gyroscope 120 may be used by controller 108 in addition to or instead of a signal from accelerometer 118 to determine whether a sensed motion corresponds to an impulse pattern that represents a predetermined motion. Additionally or alternatively, a signal from microphone 122 may be used by controller 108 in addition to or instead of a signal from accelerometer 118 and/or gyroscope 120 to determine whether sensed motion corresponds to an impulse pattern stored in memory 110 that represents a predetermined motion.

For example, suppose a small amount of force, such the type of applied force that may result from incidental contact (e.g., by a pet), is applied to an object to which lighting control apparatus 106 is secured. If controller 108 were to base the decision to alter to one or more properties of light emitted by one or more lighting units 104 on the signal from accelerometer 118 alone, controller 108 might cause an alteration in lighting where none is intended. However, in embodiments with microphone 122, controller 108 may require that a measured force be accompanied by a sufficiently-loud sound detected by microphone 122 in order to trigger a change in one or more properties of light emitted by lighting unit 104. In some embodiments, sound detected by microphone 122 may be required before controller 108 will examine a signal from accelerometer 118 and selectively energize one or more lighting units in response.

User interface 116 may take various forms, such as a plurality of dipswitches, one or more knobs or buttons, and so forth. User interface 116 may be operable to activate lighting control apparatus 106, as well as to transition lighting control apparatus 106 into and out of a "learning mode." In this learning mode, which will be described in more detail below, a user may "train" lighting control apparatus 106 to be responsive to various types of motion. This motion may be caused by various user actions, such as tapping on an object to which lighting control apparatus 106 is secured, or an object that is "mechanically coupled" with the object to which lighting control apparatus 106 is secured.

As noted above, lighting control apparatus 106 may transition into a learning state in which controller 108 may be trained to detect one or more predetermined motions, as well as trained to associate one or more lighting properties with those predetermined motions. While in the learning state, controller 108 may monitor one or more characteristics of one or more signals received from motion detector 114 over a time interval. Controller 108 may then generate and/or record impulse patterns and/or impulse responses representing various predetermined motions based on the monitored one or more characteristics. Later, controller 108 may compare sensed motions (and/or associated impulse responses) against these predetermined motions (and/or associated impulse responses) to select one or more properties of light to be emitted by one or more lighting units 104.

While lighting control apparatus 106 is in the learning state, a user may be prompted to apply force to an object to which lighting control apparatus 106 is secured so that controller 108 may learn the resulting sensed motion for future reference. For instance, in some embodiments, controller 108 may selectively cause one or more lighting units 104 or a computing device (e.g., smart phone, tablet, not depicted) operated by the user to prompt a user to apply force to the object. In one embodiment, the user may be prompted by user interface 116 to go through a series of particular motions on the object so that the controller 108 can "learn," the controller would then associate the particular signals with the particular motions (e.g. prompt the user to tap, swipe, press, etc.). In other embodiments, the user interface 116 may prompt the user to enter any motion, the lighting control apparatus 106 would then associate the received signal with a user created motion (e.g. a custom motion). The controller 108 may then associate the entered motion and the associated received signals from the motion detector 114 with the custom motion and subsequently store the custom motion.

In some embodiments, controller 108 may select which property of light to which a predetermined motion is to be assigned based on a signal from motion detector 114. For instance, if a user wishes to record one or more predetermined motions that will be used to adjust brightness, the user may tap or otherwise apply force to or move the object to which lighting control apparatus 106 is secured in a manner that will match a predetermined motion associated with brightness adjustment. This may cause controller 108 to enter a learning mode for brightness adjustment. Additionally or alternatively, the user may cause controller 108 to enter the learning mode for brightness by providing an instruction at a remote computing device such as a smart phone or tablet computer (not depicted), or by operating user interface 116. The user may then provide one or more taps that she wishes to associate with brightness control in the future. Control of other properties of light may be configured similarly.

In some embodiments, lighting control apparatus 106 may, while in its learning state, sense a previously unknown motion, and may activate a timer. A user may then have a predetermined time interval to adjust one or more lighting units 104 to desired settings (or to collectively emit a desired lighting scene). At the expiration of the timer, the settings of the one or more lighting units 104 may, in effect, become a lighting scene that is thereafter assigned to (and triggered by) detection of the previously unknown motion.

In some embodiments, a lighting control application operating on a computing device (e.g., smart phone, tablet computer, wearable computing device, etc.) may provide the user with feedback about how suitable a location is for placement of lighting control apparatus 106. For instance, the application may prompt a user to tap or otherwise impart motion at or near lighting control apparatus 106 several times, and may render graphical output (e.g., performance bar, terms such as "good"/"average"/"poor", etc.) demonstrating to the user how strongly that motion is actually detected, which may be related to its reliability (e.g. providing feedback back to the user).

In some embodiments, the lighting control application may enable a user to assign a particular lighting property or lighting scene to a particular motion. For example, the user could select from a plurality of predetermined lighting scenes, and then the lighting control application would prompt the user to provide the motion the user wishes to trigger implementation of the selected lighting scene in the future. In some embodiments, the lighting control application may also allow a user to configure how one or more lighting units 104 should react when motion is detected at lighting control apparatus 106 while a lighting scene is already being implemented by the one or more lighting units 104. For example, if a particular lighting scene is already being implemented, lighting control apparatus 106 may simply ignore sensed motions that fail to satisfy a particular threshold, or may switch one or more lighting units to a default setting (e.g., off, on, provide reading light, etc.).

Referring back to FIG. 1, a power source is provided in the form of a rechargeable battery 124, for example a lithium-ion (or "Li-ion") battery. The battery 124 may be recharged in various ways, such as via a Universal Serial Bus ("USB") charger 126. In some embodiments, in addition to or instead of a battery, lighting control apparatus 106 may include a power supply that may be connected directly to mains power. In some embodiments, lighting control apparatus 106 may include an interface that may be connected to a lighting unit 104, or to a luminaire (not depicted) into which lighting unit 104 is installed. A step-up converter 128 may be provided to ensure that voltage levels supplied by the battery 124 are converted to levels required by controller 108 and/or wireless interface 112.

In embodiments where lighting control apparatus 106 is battery-powered, various techniques may be employed to save power. In some embodiments, controller 108 may be configured to transition from an inactive state, in which controller 108 consumes a first, presumably small amount of power, to an active state, in which controller 108 consumes a second amount of power that is greater than the first amount of power. In some embodiments, controller 108 may transition from the inactive state to the active state in response to an interrupt raised by another component, such as accelerometer 118. In some embodiments, accelerometer 118 may raise the interrupt in response to sensing motion that satisfies a particular threshold. A small, e.g., incidental, amount of motion may not satisfy the threshold, and accelerometer 118 may not "wake up" controller 108. A larger amount of motion may satisfy the threshold, causing accelerometer to raise the interrupt and wake up controller 108.

Figure 2:
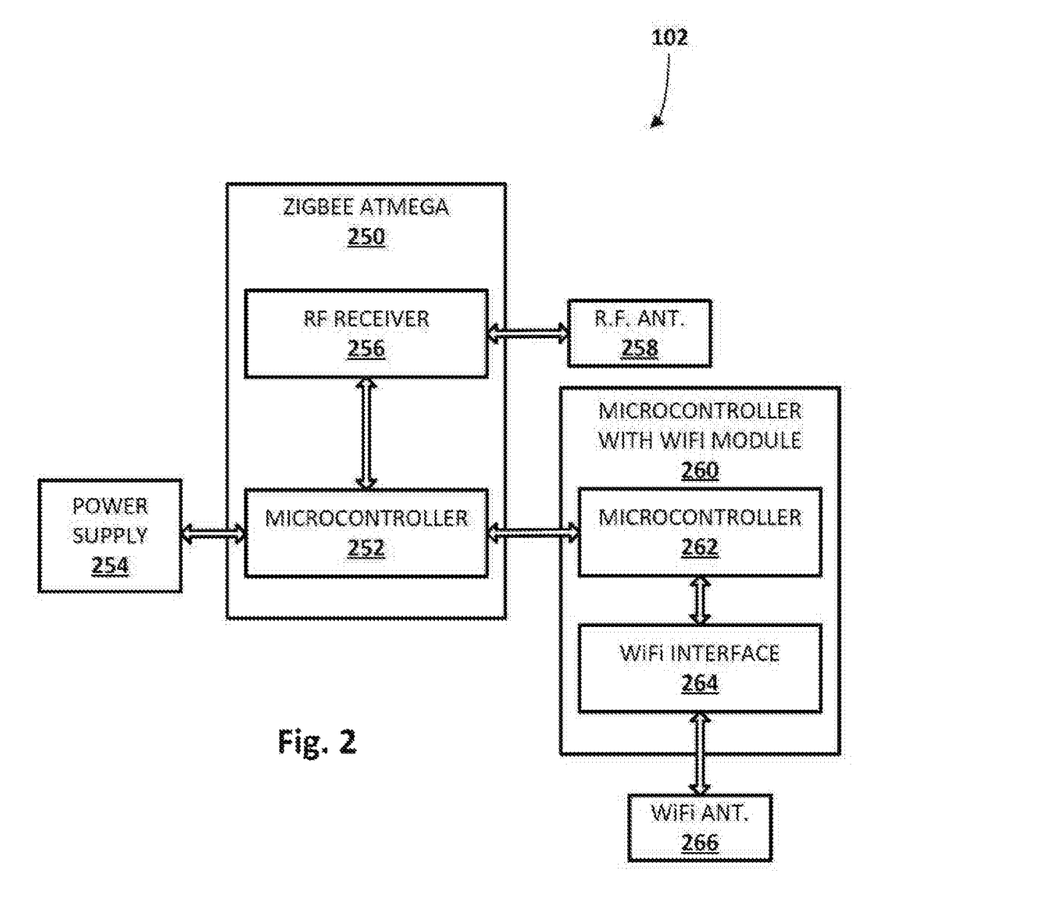
FIG. 2 depicts one example of components that may be employed in a lighting system bridge, in accordance with various embodiments.

FIG. 2 depicts one example of components that may be employed in lighting system bridge 102, in accordance with various embodiments. An ad hoc networking component 250 may come in various forms, such as a ZigBee Atmega module, and may include a microcontroller 252 powered by a power supply 254 (e.g., mains), an RF receiver module 256, and an antenna 258. A microcontroller with WiFi module 260 may include another microcontroller 262, a wireless interface such as WiFi interface 264, and a WiFi antenna 266.

Figure 3:
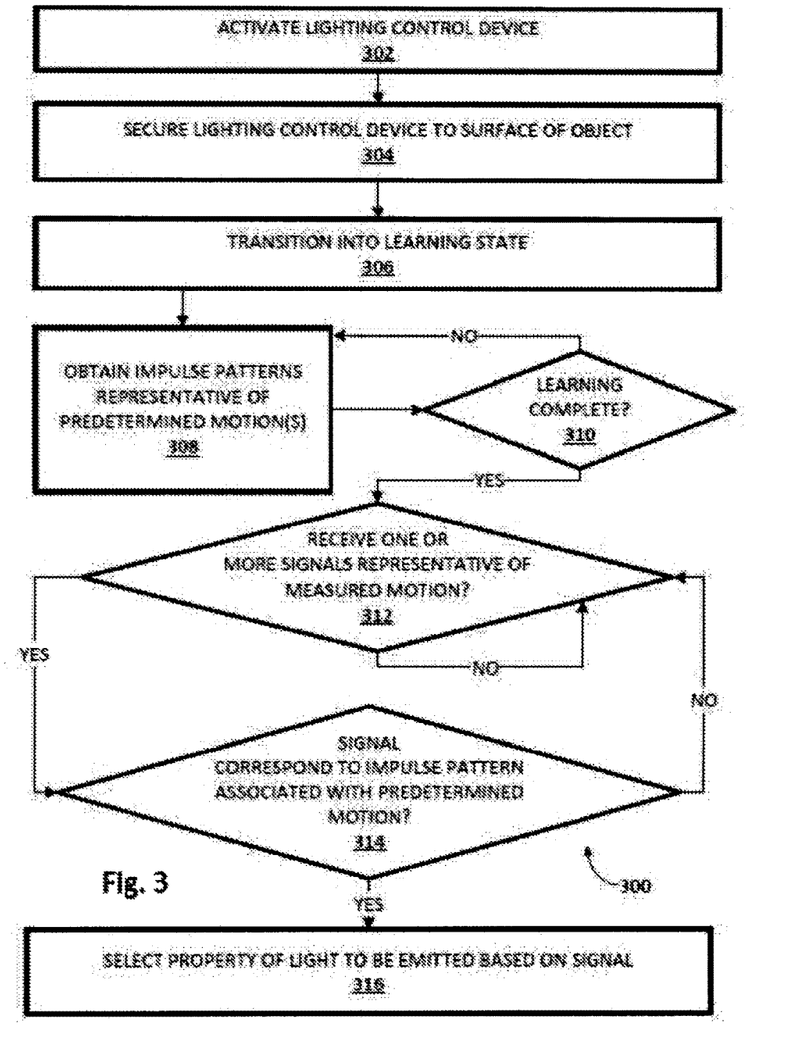
FIG. 3 depicts an example method that may be performed by/with a lighting control apparatus configured with selected aspects of the present disclosure.

FIG. 3 depicts an example method 300 that may be performed with a lighting control apparatus 106 configured with selected aspects of the present disclosure, in accordance with various embodiments. While these operations are depicted in a particular order, this is not meant to be limiting.

One or more operations may be reordered, added or omitted in accordance with various embodiments.

At block 302, lighting control apparatus 106 may be activated. For example, in some embodiments, lighting control apparatus 106 may be activated when tape is removed from secure connection 125, which in some instances may alter a capacitance of one or more probes. In other embodiments, lighting control apparatus 106 may be activated using other mechanisms, such as user interface 116. After activation but prior to placement, in some embodiments, lighting control apparatus 106 may monitor for one or more motions or other stimuli that suggest it has been secured to an object (e.g., a series of motions followed by sudden and extended lack of motion).

At block 304, lighting control apparatus 106 may be secured to a surface of an object. Various objects may be effectively turned into tap-sensitive lighting control devices when lighting control apparatus 106 is secured to their surfaces. For example, a user may secure lighting control apparatus 106 to various objects, including but not limited to picture frames, chairs, tables, door frames, doors, vases, lamps, luminaires, and so forth.

At block 306, lighting control apparatus 106 may transition into a learning state. In some embodiments, this may occur in response to detection that lighting control apparatus 106 was secured to an object at block 304. In other embodiments, lighting control apparatus 106 may transition into the learning state in response to a user command, e.g., at user interface 116.

At block 308, lighting control apparatus 106 may obtain impulse patterns representative of predetermined motions, e.g., from motion detector 114, as well as one or more indications of one or more lighting properties with which those impulse patterns should be associated. At block 310, if the learning is not yet complete, then method 300 may proceed back to block 308 and more impulse patterns may be obtained. If at block 310, the learning is complete, then method 300 may transition out of learning mode and may proceed to block 312.

At block 312, controller 108 of lighting control apparatus 106 may await, e.g., from motion detector 114, one or more signals representative of one or more measured motions (e.g., impulse patterns) that were applied to the object to which lighting control apparatus 106 was secured or to another object with which the object is mechanically coupled. In some embodiments, only signals that satisfy some sort of threshold, e.g., that are strong enough and not likely due to incidental contact with the object, satisfy block 312; other signals may be ignored. In other embodiments, signals of one type may be compared to or processed with signals of another type (e.g. signal from the accelerometer and signal from the gyroscope) to satisfy the threshold. Once one or more signals that satisfy the threshold are received by controller 108 from motion detector 114, method 300 may proceed to block 314.

At block 314, it may be determined, e.g., by controller 108, whether the one or more signals correspond to an impulse pattern (e.g., obtained at block 308) associated with a predetermined motion. If the answer is "yes," then method 300 may proceed to block 316, at which one or more properties of light to be emitted, e.g., by one or more lighting units 104, may be selected. In one embodiment, the lighting control apparatus 106 determines and controls the properties of light to be emitted by the light units 104. In another embodiment, the lighting control apparatus 106 communicates a signal to the lighting system bridge 102, which determines and controls the properties of light to be emitted by the light units 104. If the answer at block 314 is "no," however, method 300 may proceed back to block 312.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting control apparatus, comprising:
   an accelerometer;
   a wireless communication interface;
   a motion transfer and secure connection component configured to secure the lighting control apparatus to an object and to transfer motion imparted on a surface of the object to the accelerometer; and
   a controller coupled with the accelerometer and the wireless communication interface, the controller configured to:
   receive, from the accelerometer, a signal representative of motion sensed by the accelerometer;
   determine, based on the signal from the accelerometer, that the sensed motion satisfies a motion criterion and that the sensed motion corresponds with a predetermined motion, which predetermined motion corresponds to a lighting control command;
   transmit, over the wireless communication interface to a lighting unit or a lighting system bridge, the lighting control command configured to cause one or more lighting units to emit light having one or more selected properties; and
   transition to a learning state in which the controller monitors one or more characteristics of one or more signals from the accelerometer over a learning time interval and generate one or more motion criteria based on the monitored one or more characteristics.

2. The lighting control apparatus of claim 1, wherein the controller is further configured to cause audio or visual output to be rendered to prompt a user to apply a first force to the surface during the learning time interval.

3. The lighting control apparatus of claim 2, wherein the controller is further configured to cause audio or visual output to be rendered to prompt the user to apply a second force to the surface that is different than the first force in response to a determination that the first force failed to satisfy a threshold.

4. The lighting control apparatus of claim 1, wherein the controller is further configured to select, based on a signal received from the accelerometer during the learning time interval, a property of light or lighting scene to which a newly generated motion criterion is assigned.

5. The lighting control apparatus of claim 1, wherein the controller is configured to determine, based on one or more characteristics of a signal received from the accelerometer, a sensitivity threshold to be associated with the accelerometer.

6. The lighting control apparatus of claim 1, further comprising a microphone coupled with the controller, wherein the controller is configured to determine that the sensed motion satisfies the motion criterion further based on a signal from the microphone.

7. The lighting control apparatus of claim 1, further comprising a gyroscope, wherein the controller is configured to determine that the sensed motion satisfies the motion criterion further based on a signal from the gyroscope.

8. The lighting control apparatus of claim 1, wherein the controller is further configured to:
   determine, based on the signal from the accelerometer, a magnitude of the sensed motion; and
   select, based on the magnitude, the one or more properties of light emitted by the one or more lighting units.

9. The lighting control apparatus of claim 1, wherein the controller is further configured to transition from an inactive state, in which the controller consumes a first amount of power, to an active state, in which the controller consumes a second amount of power that is greater than the first amount of power, in response to an interrupt raised by the accelerometer, and the accelerometer is configured to raise the interrupt in response to sensing motion that satisfies a threshold.

10. The lighting control apparatus of claim 1, further comprising a placement sensor to raise a placement signal in response to detection that the lighting control apparatus has been secured to the surface, wherein the controller is configured to transition from an inactive state to an active state in response to the placement signal.

11. A lighting control apparatus, comprising:
    an accelerometer;
    a wireless communication interface;
    a motion transfer and secure connection component configured to secure the lighting control apparatus to an object and to transfer motion imparted on a surface of the object to the accelerometer; and
    a controller coupled with the accelerometer and the wireless communication interface, the controller configured to:
    receive, from the accelerometer, a signal representative of motion sensed by the accelerometer;
    determine, based on the signal from the accelerometer, that the sensed motion satisfies a motion criterion and that the sensed motion corresponds with a predetermined motion, which predetermined motion corresponds to a lighting control command;

transmit, over the wireless communication interface to a lighting unit or a lighting system bridge, the lighting control command configured to cause one or more lighting units to emit light having one or more selected properties;

identify, based on the sensed motion, a physical region of the surface to which force was applied; and select, based on the identified physical region, the one or more properties of light emitted by the one or more lighting units.

12. A lighting control method, comprising:

activating a lighting control apparatus;

securing the lighting control apparatus to an object;

receiving, by the lighting control apparatus, one or more signals indicative of motion imparted on the object;

identifying, based on the one or more signals, one or more predetermined motions to which the imparted motion corresponds;

selecting one or more properties of light to be emitted by one or more lighting units based on the identified one or more predetermined motions;

transitioning the lighting control apparatus into a learning state;

obtaining, from a motion detector associated with the lighting control apparatus, one or more impulse patterns for storage as one or more predetermined motions; and identifying one or more properties of light to be associated with the one or more predetermined motions.

13. The lighting control method of claim 12, wherein the transitioning is performed in response to a determination, by the lighting control apparatus, that the securing has occurred.

* * * * *